United States Patent
Malik et al.

(10) Patent No.: US 10,076,709 B1
(45) Date of Patent: *Sep. 18, 2018

(54) GAME STATE-SENSITIVE SELECTION OF MEDIA SOURCES FOR MEDIA COVERAGE OF A SPORTING EVENT

(71) Applicant: VenueNext, Inc., Santa Clara, CA (US)

(72) Inventors: Kunaldeep Malik, Palo Alto, CA (US); Gideon Yu, Hillsborough, CA (US); Paraag Marathe, Menlo Park, CA (US); Jonathan Dubin, San Francisco, CA (US)

(73) Assignee: VenueNext, Inc., Santa Clara, CA (US)

( * ) Notice: Subject to any disclaimer, the term of this patent is extended or adjusted under 35 U.S.C. 154(b) by 313 days.

This patent is subject to a terminal disclaimer.

(21) Appl. No.: 14/576,007

(22) Filed: Dec. 18, 2014

Related U.S. Application Data

(63) Continuation of application No. 14/011,669, filed on Aug. 27, 2013.

(60) Provisional application No. 61/870,183, filed on Aug. 26, 2013.

(51) Int. Cl.
| | |
|---|---|
| *H04N 7/18* | (2006.01) |
| *A63F 13/812* | (2014.01) |
| *H04N 5/232* | (2006.01) |
| *A63B 24/00* | (2006.01) |

(52) U.S. Cl.
CPC .......... *A63F 13/812* (2014.09); *H04N 5/232* (2013.01); *A63B 2024/0025* (2013.01); *A63B 2220/10* (2013.01); *A63B 2220/806* (2013.01); *A63B 2225/20* (2013.01); *A63B 2243/007* (2013.01)

(58) Field of Classification Search
CPC ........ A63B 2024/0025; A63B 2220/10; A63B 2220/30; A63B 2220/806; A63B 2225/20; A63B 2243/007; H04N 5/222; H04N 5/232; H04N 5/247; H04N 7/181; H04N 5/265;
(Continued)

(56) References Cited

U.S. PATENT DOCUMENTS

| | | |
|---|---|---|
| 5,557,717 A | 9/1996 | Wayner |
| 5,636,920 A | 6/1997 | Shur et al. |
| 6,144,375 A | 11/2000 | Jain et al. |

(Continued)

OTHER PUBLICATIONS

National Football League, "Real-time Game Information (Game Clock)", Partner Specification, Partner Specification, V 1.2, dated Nov. 4, 2008, 8 pages.

(Continued)

*Primary Examiner* — Justin Myhr
(74) *Attorney, Agent, or Firm* — Hickman Palermo Becker Bingham LLP

(57) ABSTRACT

A media processing unit may identify, automatically based on game play data relating to game events of a sporting event and a set of source selection rules, different media portions from different media sources to include in the media coverage of a particular sporting event. Each of the different media sources may be configured to deliver different media related to the sporting event. The media processing unit determines a plurality of media mappings, which each associate a media portions with a game portions. Based on the determined media mappings, for each game portion, a media processing unit may select a media portion delivery to a user as media coverage of the game portion.

19 Claims, 8 Drawing Sheets

(58) Field of Classification Search
CPC .. H04N 5/76; H04N 5/9205; G08B 13/19641;
G08B 13/19693
USPC .................................................. 725/38–59
See application file for complete search history.

(56) References Cited

U.S. PATENT DOCUMENTS

| | | |
|---|---|---|
| 6,452,609 B1 | 9/2002 | Katinsky et al. |
| 6,545,689 B1 | 4/2003 | Tunli |
| 6,631,522 B1 | 10/2003 | Erdelyi |
| 6,795,638 B1 | 9/2004 | Skelley |
| 6,977,667 B1 | 12/2005 | Burke |
| 7,110,955 B1 | 9/2006 | Barhnart et al. |
| 7,791,607 B1 | 9/2010 | Hughes et al. |
| 8,214,741 B2 | 7/2012 | Errico et al. |
| 8,353,345 B2 | 1/2013 | Fiore et al. |
| 8,612,534 B1 | 12/2013 | Hossack |
| 8,634,708 B2 | 1/2014 | Chevallier et al. |
| 9,032,296 B1 | 5/2015 | Jeffs |
| 2002/0012526 A1 | 1/2002 | Sai et al. |
| 2002/0040253 A1 | 4/2002 | Mcnally et al. |
| 2002/0191952 A1 | 12/2002 | Fiore et al. |
| 2003/0001880 A1 | 1/2003 | Holtz et al. |
| 2003/0063125 A1 | 4/2003 | Miyajima et al. |
| 2003/0074373 A1 | 4/2003 | Kaburgi et al. |
| 2003/0090504 A1 | 5/2003 | Brook et al. |
| 2003/0097654 A1* | 5/2003 | Franken ............. H04B 7/18547 725/1 |
| 2003/0137531 A1 | 7/2003 | Katinsky et al. |
| 2004/0008225 A1 | 1/2004 | Campbell |
| 2004/0056879 A1 | 3/2004 | Erdelyi |
| 2004/0070594 A1 | 4/2004 | Burke |
| 2004/0095377 A1 | 5/2004 | Salandro |
| 2004/0205698 A1* | 10/2004 | Schliesmann ...... H04N 5/44513 717/106 |
| 2004/0226012 A1 | 11/2004 | Awada et al. |
| 2005/0005308 A1 | 1/2005 | Logan |
| 2005/0204294 A1 | 9/2005 | Burke |
| 2005/0210410 A1 | 9/2005 | Ohwa et al. |
| 2006/0277460 A1 | 12/2006 | Forstall et al. |
| 2006/0277481 A1 | 12/2006 | Forstall et al. |
| 2007/0168543 A1 | 7/2007 | Krikorin et al. |
| 2007/0186183 A1 | 8/2007 | Hudson |
| 2007/0209018 A1 | 9/2007 | Lindemann |
| 2007/0245238 A1 | 10/2007 | Fugitt |
| 2007/0300157 A1 | 12/2007 | Clausi et al. |
| 2008/0040753 A1* | 2/2008 | Anandpura ......... H04N 7/17318 725/60 |
| 2008/0046922 A1* | 2/2008 | Jankins ............. H04N 7/17318 725/35 |
| 2008/0060001 A1 | 3/2008 | Logan et al. |
| 2008/0066011 A1 | 3/2008 | Urrabazo et al. |
| 2008/0066111 A1 | 3/2008 | Ellis et al. |
| 2008/0082922 A1 | 4/2008 | Biniak et al. |
| 2008/0086688 A1 | 4/2008 | Chandratillake et al. |
| 2008/0086755 A1 | 4/2008 | Darnell et al. |
| 2008/0129825 A1* | 6/2008 | DeAngelis et al. ......... 348/169 |
| 2008/0172615 A1 | 7/2008 | Igelman et al. |
| 2008/0238615 A1 | 10/2008 | Carpenter |
| 2008/0244453 A1 | 10/2008 | Cafer |
| 2008/0244456 A1 | 10/2008 | Shimizu |
| 2008/0305870 A1 | 12/2008 | Henderson |
| 2009/0070407 A1 | 3/2009 | Castle et al. |
| 2009/0132924 A1 | 5/2009 | Vasa et al. |
| 2009/0143007 A1 | 6/2009 | Terlizzi |
| 2009/0158192 A1 | 6/2009 | De Peuter |
| 2009/0164902 A1 | 6/2009 | Cohen et al. |
| 2009/0164904 A1 | 6/2009 | Horowitz et al. |
| 2009/0288009 A1 | 11/2009 | Dulaney |
| 2009/0290848 A1 | 11/2009 | Brown |
| 2010/0005399 A1 | 1/2010 | Friedman et al. |
| 2010/0026809 A1* | 2/2010 | Curry .................... H04N 5/222 348/157 |
| 2010/0035682 A1 | 2/2010 | Gentile et al. |
| 2010/0050198 A1 | 2/2010 | Mockry et al. |
| 2010/0077355 A1 | 3/2010 | Belinsky et al. |
| 2010/0278509 A1 | 11/2010 | Nagano |
| 2010/0287473 A1 | 11/2010 | Recesso et al. |
| 2010/0287592 A1 | 11/2010 | Patten et al. |
| 2010/0299183 A1 | 11/2010 | Fujioka |
| 2011/0013087 A1 | 1/2011 | House et al. |
| 2011/0066943 A1 | 3/2011 | Brillon et al. |
| 2011/0090402 A1 | 4/2011 | Huntington et al. |
| 2011/0113348 A1 | 5/2011 | Twiss et al. |
| 2011/0154200 A1 | 6/2011 | Davis et al. |
| 2011/0169959 A1* | 7/2011 | DeAngelis et al. ......... 348/157 |
| 2011/0173214 A1 | 7/2011 | Karim |
| 2011/0246889 A1 | 10/2011 | Moore |
| 2011/0291945 A1 | 12/2011 | Ewing et al. |
| 2011/0316884 A1 | 12/2011 | Glambalvo et al. |
| 2012/0027379 A1* | 2/2012 | Thompson et al. ......... 386/241 |
| 2012/0078667 A1 | 3/2012 | Denker et al. |
| 2012/0130741 A1 | 5/2012 | Sparandara et al. |
| 2012/0131507 A1 | 5/2012 | Sparandara et al. |
| 2012/0166955 A1 | 6/2012 | Bender |
| 2012/0166964 A1 | 6/2012 | Tseng |
| 2012/0179969 A1 | 7/2012 | Lee et al. |
| 2012/0189273 A1 | 7/2012 | Folgner et al. |
| 2012/0192121 A1 | 7/2012 | Bonnat |
| 2012/0246567 A1 | 9/2012 | Brahms et al. |
| 2012/0260211 A1 | 10/2012 | Sathish et al. |
| 2012/0311447 A1 | 12/2012 | Chisa et al. |
| 2012/0324357 A1 | 12/2012 | Viegers et al. |
| 2013/0036369 A1 | 2/2013 | Mitchell et al. |
| 2013/0047085 A1 | 2/2013 | Roberts et al. |
| 2013/0055128 A1 | 2/2013 | Muti et al. |
| 2013/0080968 A1 | 3/2013 | Hanson et al. |
| 2013/0086501 A1 | 4/2013 | Chow et al. |
| 2013/0095909 A1 | 4/2013 | O'Dea |
| 2013/0132836 A1 | 5/2013 | Ortiz |
| 2013/0157735 A1 | 6/2013 | Amaitis et al. |
| 2013/0178284 A1 | 7/2013 | Hughes et al. |
| 2013/0191752 A1 | 7/2013 | Lapierre et al. |
| 2013/0227596 A1 | 8/2013 | Pettis et al. |
| 2013/0275151 A1 | 10/2013 | Moore et al. |
| 2013/0300937 A1* | 11/2013 | Williams et al. ............ 348/581 |
| 2014/0046802 A1 | 2/2014 | Hosein |
| 2014/0059491 A1 | 2/2014 | Kim |
| 2014/0081903 A1 | 3/2014 | Koosel |
| 2014/0082506 A1 | 3/2014 | Maxwell et al. |
| 2014/0192204 A1* | 7/2014 | Glazer ......................... 348/169 |
| 2014/0195918 A1 | 7/2014 | Friedlander |
| 2014/0213357 A1 | 7/2014 | Claffey |
| 2014/0214983 A1 | 7/2014 | Hossack |
| 2014/0253431 A1 | 9/2014 | Gossweiler et al. |
| 2014/0258859 A1 | 9/2014 | Plumb |
| 2014/0282745 A1 | 9/2014 | Chipman et al. |
| 2014/0337763 A1 | 11/2014 | Feldstein et al. |
| 2015/0058730 A1 | 2/2015 | Dubin |
| 2015/0058780 A1 | 2/2015 | Malik et al. |
| 2015/0058781 A1 | 2/2015 | Malik et al. |
| 2015/0248917 A1 | 9/2015 | Chang |

OTHER PUBLICATIONS

Nessman, "ESPN Gamecast a Sweet Way to Keep Up With a Game", dated Jan. 23, 2012, http://kfmx.com/espn-gamecast-a-sweet-way-to-keep-up-with-a-game/, 1 page.

* cited by examiner

FIG. 4

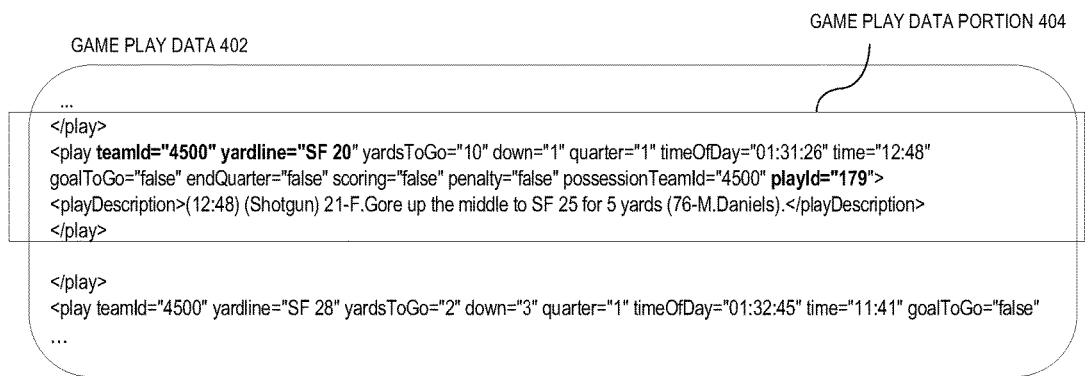

```
...
</play>
<play teamId="4500" yardline="SF 20" yardsToGo="10" down="1" quarter="1" timeOfDay="01:31:26" time="12:48"
goalToGo="false" endQuarter="false" scoring="false" penalty="false" possessionTeamId="4500" playId="179">
<playDescription>(12:48) (Shotgun) 21-F.Gore up the middle to SF 25 for 5 yards (76-M.Daniels).</playDescription>
</play>

</play>
<play teamId="4500" yardline="SF 28" yardsToGo="2" down="3" quarter="1" timeOfDay="01:32:45" time="11:41" goalToGo="false"
...
```

GAME PLAY DATA 402

GAME PLAY DATA PORTION 404

GAME STATE-SENSITIVE SELECTION OF MEDIA SOURCES FOR MEDIA COVERAGE OF A SPORTING EVENT

CROSS-REFERENCE TO RELATED APPLICATIONS; BENEFIT CLAIM

This application claims the benefit under 35 USC § 120 as a continuation of application Ser. No. 14/011,669, filed Aug. 27, 2013, which claims the benefit under 35 U.S.C. § 119(e) of application 61/870,183, filed Aug. 26, 2013, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure relates to delivering media coverage of a sporting event to user mobile computing devices and, more specifically, to techniques for automatically selecting different media sources for different portions of the same sporting event based on the game state of a sporting event.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Media coverage of sporting events may be in the form of video, audio, data, pictures or a combination thereof. Media coverage may comprise coverage of the game itself or other media related to the sporting event, such as spectator reaction to the event. The media coverage may be displayed to a viewer in real-time, where coverage of an event is displayed almost instantaneously after the event occurs, or at a later time such as in response to a user selecting to view a replay of the sporting event or a portion thereof.

The media coverage may comprise portions of different media captured by different media sources. For example, the first ten (10) seconds of video coverage of a particular football game may feature a video recorded by a capture device associated with a first video source, a video camera positioned at the San Francisco thirty-yard line partially facing the Green Bay end zone. The subsequent ten (10) seconds of the video coverage may comprise a video recorded by a capture device associated with a second media source, a video camera positioned at the Green Bay thirty-yard line partially facing the San Francisco end zone.

According to one approach, a game media operator selects the appropriate media source for different portions of the game while viewing the sporting event, either during live viewing or by viewing media coverage of the sporting event. For example, each media source may send a live feed of the media being recorded by the media source to the game media operator. The game media operator may view the media feed received from each of the media sources continuously throughout the game and, for each moment of the game, the game media operator may select the best media source for the corresponding moment of the game. The game media operator may select the media source(s) based on a determination that the game action occurring at that moment is most clearly visible in the media recorded by the selected media source(s). The media associated with the selected media source may be delivered to the viewer.

However such an approach is time-consuming, labor-intensive, and error-prone. If the game media operator acts quickly, the operator risks choosing a media source that provides sub-optimal coverage of the game. On the other hand, if the media operator choses carefully, the time delay between occurrence of game events and delivery of media coverage to the user increases. Furthermore, the selection process requires intense concentration required for the duration of the sporting event. The selection process is also not personalized with respect to viewers or end users. Improved techniques for selecting and delivering the best media coverage of sporting events in the fastest manner possible are needed.

SUMMARY OF THE INVENTION

The appended claims may serve as a summary of the invention.

BRIEF DESCRIPTION OF THE DRAWINGS

In the drawings:

FIG. 4 illustrates a portion of example game play data.

DETAILED DESCRIPTION

Figure 1:
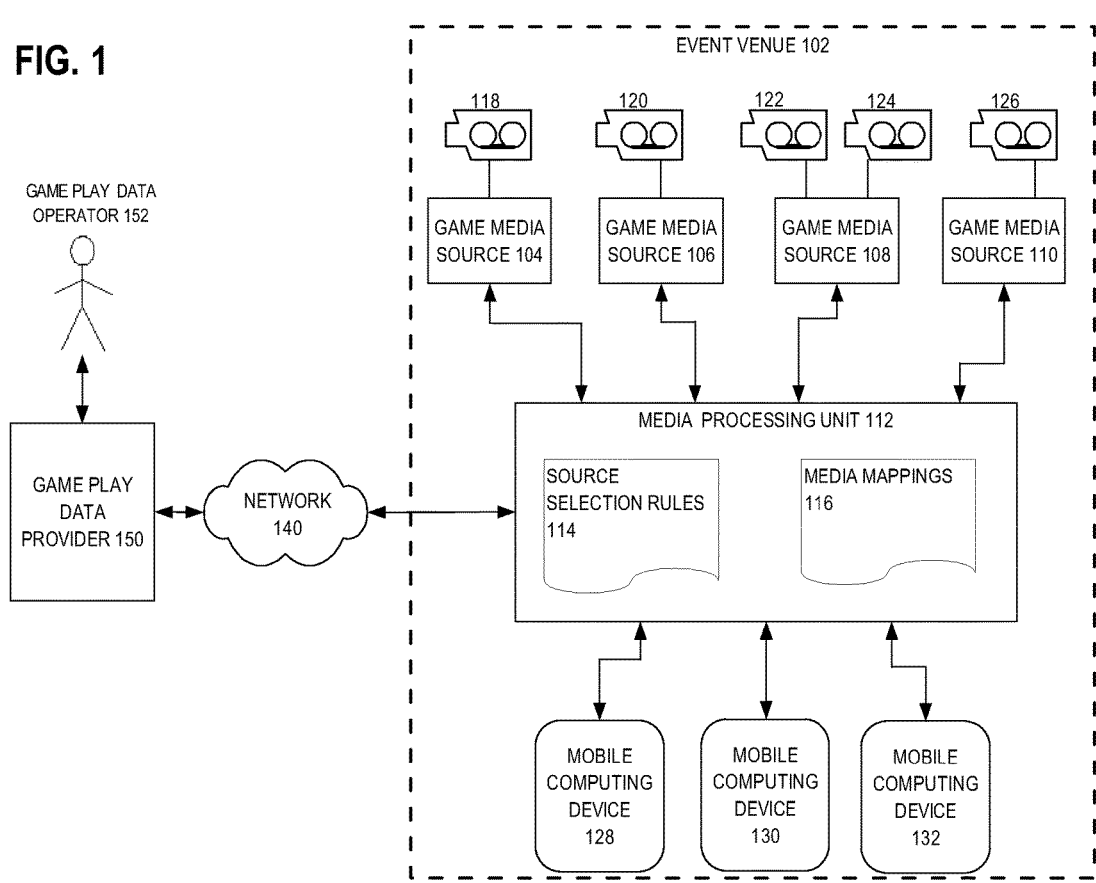
FIG. 1 illustrates an example networked computer system configured to process game play data and to provide game-related data and/or media to mobile computing devices.

Techniques for game state-sensitive selection of media sources for media coverage of a sporting event are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Example Process for Using Media Mappings
    4.0 Example Process for Determining a Media Mapping
    5.0 Source Selection Rules
    6.0 Mapping Multiple Media Portions to a Game Portion 7.0 Implementation Mechanisms—Hardware Overview
8.0 Extensions and Alternatives 1.0 General Overview Game state-sensitive selection of media sources for media coverage of a sporting event is described. In an embodiment, game play data relating to game events of a sporting event is received. A plurality of media mappings that associate media portions with game portions of the sporting event are determined at a computing device, where determining a particular media mapping of the media mappings comprises: identifying a portion of the game play data that corresponds to a particular game portion among the game portions; determining, based on particular data in the portion of the game play data and a particular source selection rule of a set of source selection rules, that a particular media source corresponds to the particular game portion, where the particular media source is selected from a plurality of media sources, each of which is configured to deliver different media related to the sporting event; selecting, based on the determination that the particular media source corresponds to the particular game portion, a particular media portion associated with the particular media source as selected media coverage of the particular game portion. The particular media mapping is stored, where the particular media mapping associates the particular media portion with the particular game portion. The particular media portion is selected for delivery to a user based on the particular media mapping.

In an embodiment, the particular data indicates that a particular type of game event occurred during the particular game portion and the particular source selection rule indicates that the particular type of game event is associated with the particular media source.

In an embodiment, the particular data indicates that a particular player was active during the particular game portion and the particular source selection rule indicates that activity by the particular player is associated with the particular media source.

In an embodiment, the plurality of media sources includes a media source associated with a recording of at least a part of the sporting event.

In an embodiment, the plurality of media sources includes a media source associated with a recording of spectator reaction to the sporting event.

In an embodiment, the plurality of media sources includes a first media source that is associated with a first view of the sporting event from a first viewpoint and a second media source that is associated with a second view of the sporting event from a different viewpoint.

In an embodiment, the plurality of media sources include a first media source that is associated with a first player in the sporting event and a second media source that is associated with a different player in the sporting event.

In an embodiment, at least some of the media mappings are determined during the sporting event.

In an embodiment, determining that the particular media source corresponds to the particular game portion comprises identifying a value associated with a particular attribute in the particular data and determining whether the value associated with the particular attribute matches a value identified by the particular source selection rule.

In an embodiment, the selection of the particular media portion as the chosen media coverage of the particular game portion is based on a timestamp associated with the particular media portion.

2.0 Structural and Functional Overview

FIG. 1 illustrates an example networked computer system configured to process game play data and to provide game-related data and/or media to mobile computing devices. Game play data provider 150 may generate game play data relating to game events of a sporting event. In an embodiment, a person associated with game play data provider 150, such as game play data operator 152, may input information about game events as they occur. For example, game play data operator 150 may, for each play or event in the sporting event, identify the scoring team or player; identify the current location of a ball, puck, or other object of interest; and/or provide a text summary of the play or event that occurred. The game play data may include information provided by game play data operator 152.

Game play data provider 150 may send the game play data to media processing unit 112 via network 140. Network 140 may be a public network such as the internet or may be a private network designed to facilitate faster transfer of game play data to media processing unit 112, or a combination of networks and internetworks. In some embodiments, media processing unit 112 receives and analyzes game play data from a plurality of providers.

Game media sources 104, 106, 108, 110 are media sources configure to deliver media related to the sporting event. The game media sources 104, 106, 108, 110 may be associated with different entities. In one embodiment, game media sources 104 and 106 are associated with a first team, game media source 108 is associated with an opposing team, and game media source 110 is associated with a neutral party, such as a neutral sponsor of the game or a league to which both participating teams belong.

Game media sources 104, 106, 108, 110 may be associated with one or more capture devices, which capture the media delivered by the respective game media source. A capture device may be any device used to capture media coverage of the sporting event, such as a video camera, a camera for capturing still photographs, or a sound recorder. For example, game media source 104 may deliver media coverage collected by capture device 118, for example Camera 3 of the home team, game media source 106 may deliver coverage collected by capture device 120, for example Camera 5 of the home team, and game media source 110 may deliver coverage collected by capture device 126.

In some embodiments, a media source corresponds to a single capture device. In other embodiments, a media source may deliver media captured from a plurality of capture devices. For example, game media source 108 may deliver coverage collected by a plurality of different cameras operated by the visiting team including capture devices 122 and 124. Game media source 108 may deliver coverage from capture device 122 for some parts of the game and may deliver coverage from capture device 124 for other parts of the game. A human game-day operator may be associated with game media source 108 and the game-day operator may, for each portion of the game, select media from either media capture device 122 or 124 as corresponding to the game portion. For example, the game-day operator may determine that the game action for certain portions of the game is more clearly visible or audible in the media captured by media capture device 122 than in the media captured by media capture device 124. For other portion of the game, the game-day operator may determine that the game action is more clearly visible or audible in the media captured by media capture device 124. Thus, game media source 108 may deliver media captured by media capture device 122 for certain portions of the game and media captured by media capture device 124 for other portions of the game.

One or more of game media sources 104, 106, 108, 110 may be operated by the same entity that operates media processing unit 112. For example, media processing unit 112 and game media source 108 may both be operated by a business entity that owns the hosting team.

Media processing unit 112 may receive media associated with game media sources 104, 106, 108, and 110 and may select media coverage for delivery to user devices based in part on game data received from game play data provider 150 and source selection rules 114. Media processing unit 112 may store media mappings 116, which associate particular media portions with particular game portions and are determined based on the selected sources.

Media processing unit 112 may select media for delivery to user devices such as mobile computing devices 128, 130, 132 based on media mappings 116. Mobile computing devices 128, 130, 132 may be smartphones, tablet computers, netbook computers, ultrabook computers, laptop computers, or other mobile computing devices. Mobile computing devices 128 130, 132 may receive the media in a streaming format or the media may be downloaded to the mobile computing devices.

For example, in one embodiment, the event venue 102 is configured with a plurality of wireless access points and internetworking equipment to couple the media processing unit 112 to the mobile computing devices 128, 130, 132 using wireless links. In one embodiment, the event venue 102 comprises in excess of 50,000 seats and wireless access points are positioned near the seats using approximately one wireless access point per 100 seats. The wireless access points are coupled by wired links to routers, switches and other elements of internetworking infrastructure that are coupled to media processing unit 112 and that implement a high-speed, high-capacity local network or set of networks for servicing the mobile computing devices 128, 130, 132. The bandwidth and processing capacity of the media processing unit 112 and the networking infrastructure are configured to accommodate a large number of simultaneous connections of media processing unit 112, or a computing cluster in which the media processing unit is located, to a large number of mobile computing devices. For example, in one embodiment the infrastructure may accommodate in excess of 50,000 simultaneous streaming video connections of mobile computing devices to the media processing unit 112, to permit each of the mobile computing devices to obtain a different, personalized game experience involving selective delivery from the game media sources.

In other embodiments, the selected media may be delivered to mobile computing devices 128, 130, 132 from another source. For example, game media sources 104, 106, 108, and 110 may deliver the selected media to mobile computing devices 128, 130, 132 directly without delivering the media to media processing unit 112. Media processing unit 112 may select the appropriate media source for delivering the media coverage and may cause the appropriate media to be delivered directly from the media sources to the mobile computing devices at the appropriate times.

Game media sources 104, 106, 108, 110, media processing unit 112, and mobile computing devices 128, 130, and 132 all may be within or near event venue 102, which is the location at which the sporting event is held. Event venue 102 may be a stadium, arena, field, or other physical facility or location at which the sporting event is held. In other embodiments, one or more of game media sources 104, 106, 108, 110, media processing unit 112, and mobile computing devices 128, 130, and 132 may be located outside event venue 102. For example, one of the media sources may be associated with a local TV or radio station that delivers the media to media processing unit 112 from its studio.

In an embodiment, media processing unit 112 verifies that the mobile computing devices are within an acceptable geographic area before delivering the media to the mobile computing device. For example, media processing unit 112 may only stream the media coverage to a mobile computing device if the mobile computing is determining to be within or near event venue 102. In other embodiments, media coverage of the event may also be delivered to users located elsewhere. In some embodiments, media processing unit 112 may deliver media to user devices other than mobile computing devices, such as personal computers (PCs), televisions, and other devices.

Figure 2:
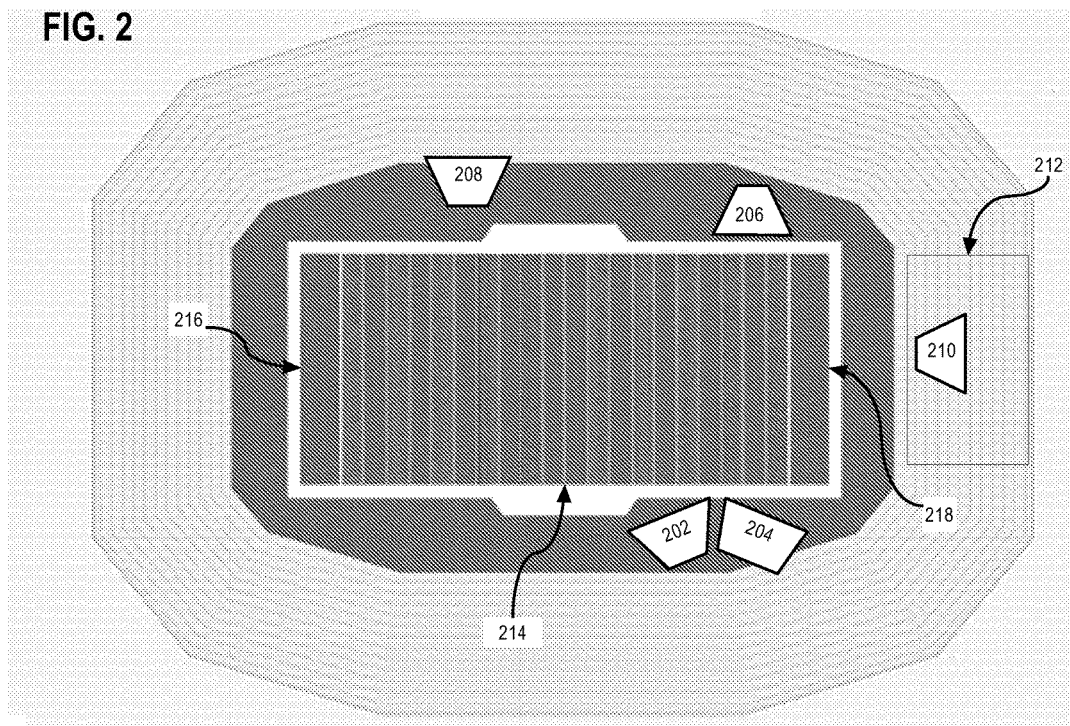
FIG. 2 illustrates an example configuration of media capture devices relative to an example sporting event site.

The plurality of media capture devices may be located at different locations, oriented in different ways, and may pan in different directions, each recording or photographing the sporting event from a different viewpoint. FIG. 2 illustrates an example configuration of media capture devices relative to an example sporting event site. Media capture devices 202 and 204, which may be cameras, video recorders, sound recorders, or other media capture devices, are positioned at the perimeter of a football field 214 and are oriented to face opposite directions. Media capture device 202 is oriented to capture media coverage of a play heading towards end zone 216 and media capture device 204 is oriented to capture media coverage of a play headed towards end zone 218. Media capture device 206 is oriented in a neutral direction and positioned to capture media coverage of a play near end zone 218. Other media capture devices may capture media coverage from above the event venue. For example, the media capture device may comprise a camera or other media capture device suspended above the event venue.

The location or orientation of or more of the media capture device may change during the sporting event. For example, media capture device 20 may pan at various different times during the sporting event. For purposes of illustrating a clear example, FIG. 2 illustrates a limited number of media capture devices, but other embodiments may use any number of media capture devices at the event venue.

Media capture device 208 is oriented to face the seating area and may be configured to capture spectator reaction to the sporting event. Media capture device 208 may be angled to capture the reaction of a particular spectator of interest, such as a family member of a key player in the sporting event. Media capture device 210, which may be a sound recorder, is located within commentator box 212 and is positioned to record the commentator's oral commentary during the sporting event.

In other embodiments, media capture devices may be oriented and positioned in other ways. For example, certain capture devices may be configured to capture reactions of non-participating players such as players seated on the bench or reactions of a coach, to capture exterior views of the event venue or related facilities, or to capture events within interior facilities such as locker rooms or concessions.

3.0 Example Process for Using Media Mappings

Figure 3:
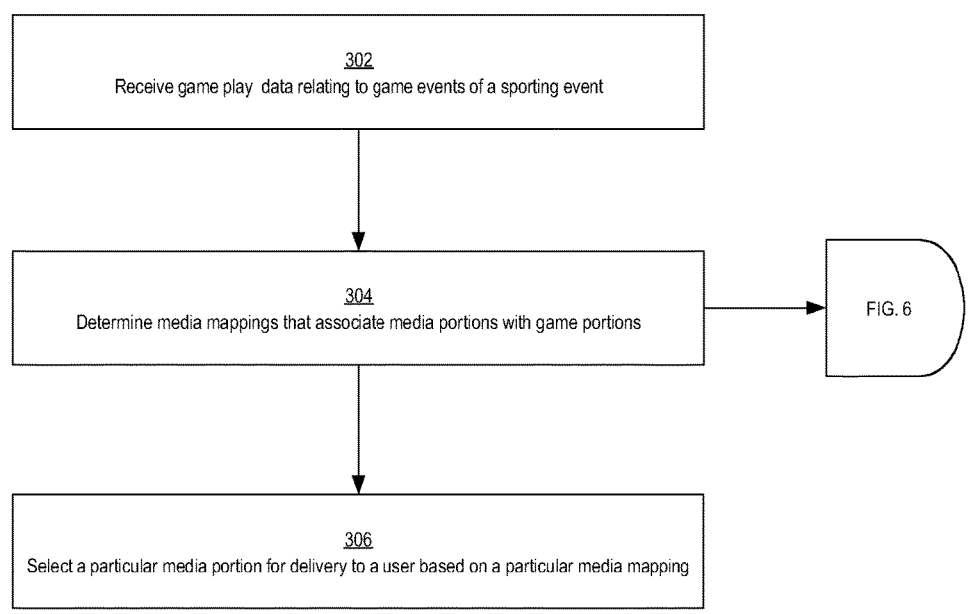
FIG. 3 illustrates an example process for identifying media portions for delivery based on received game play data.

FIG. 3 illustrates an example process for identifying media portions for delivery based on received game play data. The process of FIG. 3 may be performed at media processing unit 112. At block 302, media processing unit 112 receives game play data relating to game events of a sporting event. The game play data may describe the game state of a sporting event at various points during the sporting event. Specifically, the game play data may include information relating to various game events occurring in the sporting event.

FIG. 4 illustrates a portion of example game play data. Game play data 402 includes a play element for each play that occurs in a football game. The play element includes various information about the play such as a team identifier identifying the team that performed the play, the yard line at which the play began, the number of yards to go for a down, the quarter in which the play occurred, the time of day when the play began, the "game clock time" indicating the time remaining in the game at the beginning of the play, whether the play commenced when the team in possession was goal to go with respect to the non-possessing team's end zone, whether the play was the last play of the quarter, whether the play resulted in a score, whether the play resulted in a penalty, the team that had possession of the ball at the conclusion of the play, a play identifier that uniquely identifies the play, and a text description of the play including names and jersey numbers of the players that participated in the play. In other embodiments, the received game play data may include additional or different information. For purposes of illustrating a clear example, game play data 402 is shown in eXtensible Markup Language (XML) format. However, other data interchange formats may be used in other embodiments and the particular format of the data is not critical.

Game play data provider 150 may send game play data to media processing unit 112 in real-time. In this context, real-time may mean within a very brief period after the corresponding game event occurs, but is not necessarily instant. For example, game play data provider 150 may send each portions of game play data almost instantaneously after the occurrence of the game event described in the game play data portion. In other embodiments, game play data 402 may be sent in a more delayed manner. The particular amount of time or delay between a game event and sending game play data may differ in different embodiments.

Figure 6:
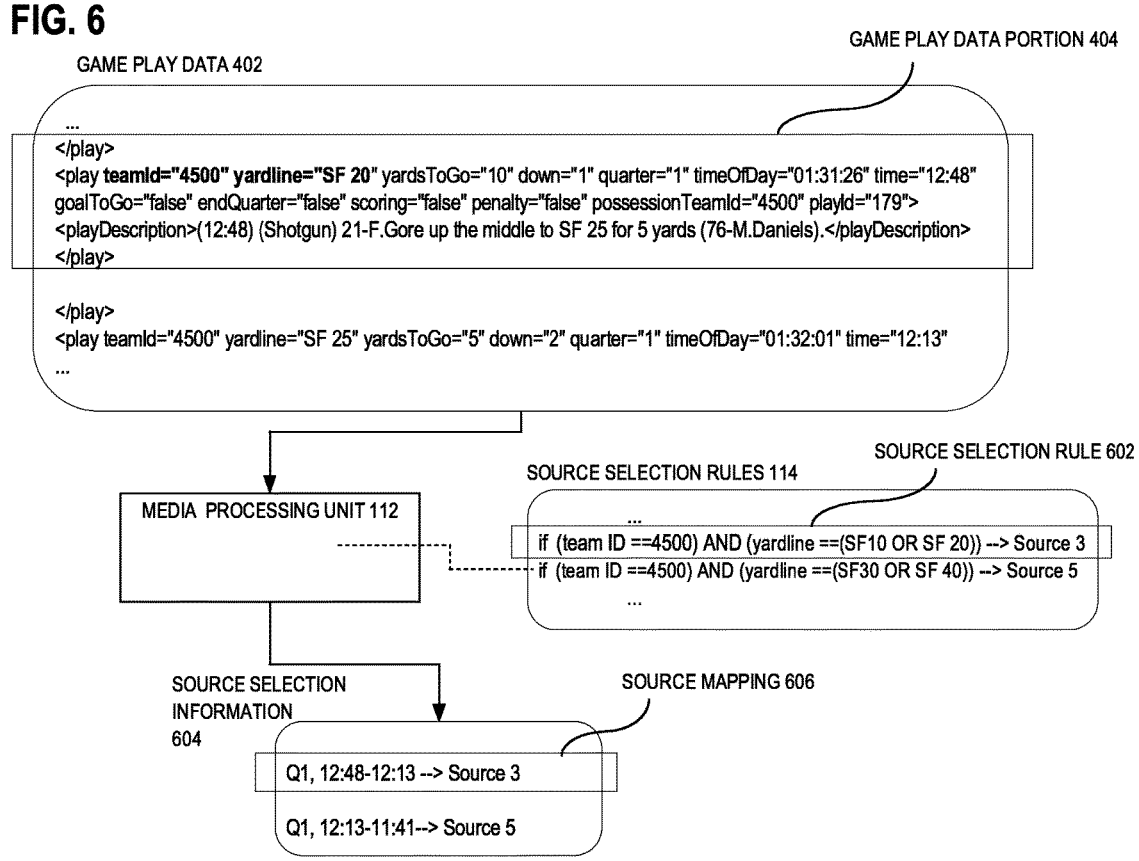
FIG. 6 illustrates an example game play data portion, an example source selection rule, and example source selection information which may be used in a process of determining a media mapping.

At block 304, media processing unit 112 determines media mappings that associate media portions with game portions. A media mapping may identify the media portion that has been selected as the chosen media coverage of the corresponding game portion. Media processing unit 112 may store a mapping identifying a corresponding media source for each portion of a game. FIG. 6 illustrates an example process for determining a media mapping and is further described in other sections herein.

In some embodiments, the media mapping includes a media portion identifier that identifies the media portion, by identifying a particular media source associated with the media and the game clock times of the game portion covered by the media. For example, a particular media mapping may be "Q2, 09:09-08:50→Source 6; Q2, 09:09-08:50." The particular media mapping indicates that the portion of the game that occurs during a game clock time range of 09:09-08:50 in Quarter 2 is associated with the portion of the media provided by Media Source 6 that corresponds to game clock times of Q2, 09:09-08:50. Media received from media sources may be associated with timestamps that indicate, for each media portion included in the media, which game portion the media portion relates to. The timestamps may be in terms of game clock time, local time, universal time, or some other format for expressing the time of various game events.

In other embodiments, the selected media portion may be extracted from the remaining portions of the media item to which the media portion belongs and may be stored in conjunction with a game portion identifier identifying the corresponding game portion. The media mapping may comprise the sliced media portion and the associated game portion identifier.

The segmentation of a game into game portions may correspond to the format of the received game play data. For example, game play data 402 may be separated into play elements where each play element represents a single play and game play data provider 150 may create and send a new play element to media processing unit 112 at the conclusion of each play. In such an embodiment, each game portion may represent a particular play of the game.

At block 306, media processing unit 112 selects a particular media portion for delivery to a user based, at least in part, on a particular media mapping. In some embodiments, game play data is received in real-time. In this context, real-time may mean within a very brief period after the corresponding game event occurs, but not necessarily instantaneously. In response to receiving each game play data portion, media processing unit 112 may automatically determine a media mapping for the game portion corresponding to the incoming game play data portion. In some embodiments, the delivery of the selected media portion to the user may also occur in real-time, within a brief period of time after the occurrence of the game event being covered by the selected media portion. Media processing unit 112 may cause the media portion identified in the determined media mapping to be delivered to the user.

In other embodiments, a user may select to view media coverage of the game, or portions thereof, at a later time. In such an embodiment, media processing unit 112 may cause delivery of the corresponding media portion(s) in response to receiving a user selection to view media coverage of selected game portion(s). In response to receiving a user selection to view coverage of selected game portion(s), media processing unit 112 may identity the media mapping associated with the selected game portions(s) and may cause delivery of the game portion(s) identified in the media mappings.

Figure 5:
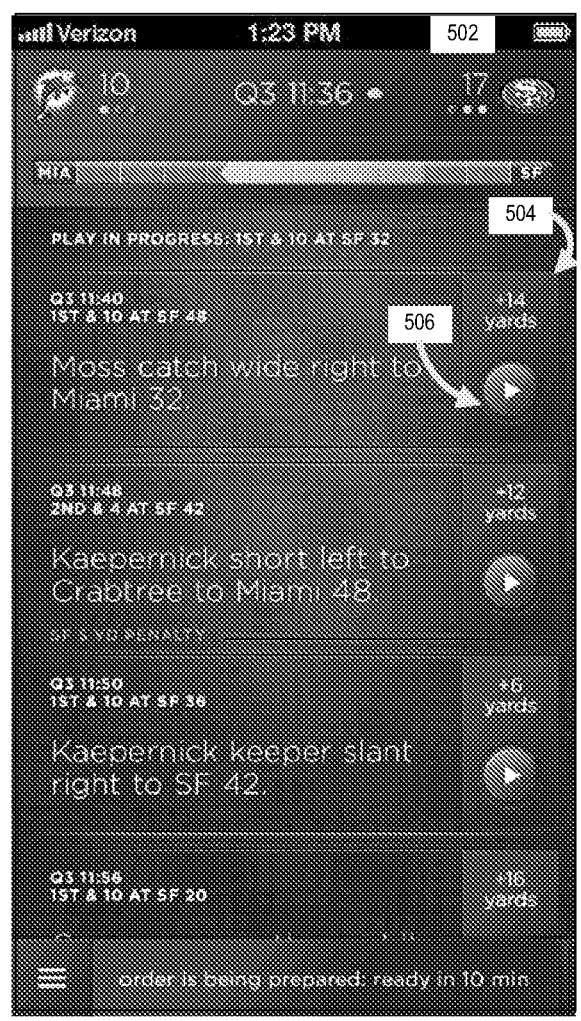
FIG. 5 illustrates an example user interface, using which a user may request to view media coverage of particular game portions.

FIG. 5 illustrates an example user interface with which a user may interact to view media coverage of particular game portions. User interface 502 may display upon a user device such as mobile computing device 128, 130, 132, and may be implemented, for example, in the context of a mobile computer program application or "app" that includes features and functions other than those described herein. User interface 502 comprises a set of graphical tiles, each of which represent a particular play in a particular football game. For example, graphical tile 504 represents the particular play occurring at game clock time of 11:40 in Q3. Graphical tile 504 comprises media control 506, which when selected causes media coverage of the play occurring at game clock time of 11:40 in Q3 to display.

When media control 506 is selected, the user device upon which user interface 502 is displayed may request media coverage of the play occurring at game clock time of 11:40 in Q3 from media processing unit 112. In response to receiving the request, media processing unit 112 may identify the particular media portion to deliver by locating the media mapping corresponding to the game portion occurring at game clock time of 11:40 in Q3. Media processing unit 112 may deliver the media portion identified in the located media mapping.

In an embodiment, the media portion identified in the located media mapping may be delivered from media processing unit 112 to user interface 502 of an end user's mobile computing device using the networking infrastructure within the event venue 102 that has been described for FIG. 1. In this arrangement, a particular end user of user interface 502 of a particular mobile computing device 128 may receive a personalized in-game, at-seat experience by selecting a particular game portion and promptly receiving streaming video or other media associated with that game portion based on the media mappings, while other users of other mobile computing devices 130, 132 are viewing other video, game data, or operating other functions of the app at their seats. Further, using the process herein, the operation of a networked media collection and distribution system is made more efficient because individual media feeds can be selected more efficiently and automatically based upon the media mappings and in coordination with game data, so that end user computing devices receive an accurate media item more rapidly and in synchronization with game data that is used in other aspects of a display on the end user computing devices.

4.0 Example Process for Determining a Media Mapping

FIG. 6 illustrates an example game play data portion, an example source selection rule, and example source selection information which may be used, in one embodiment, in a process of determining a media mapping.

Media processing unit 112 may receive game play data 402, which comprises game play data portion 404. Media processing unit may comprise source selection rules 114, which include source selection rule 602. Media processing unit 112 may determine source selection information 604 based on the received game play data 402 and source selection rule 602. Specifically, media processing unit 112 may determine source selection information 604 based on game play data portion 404 and source selection rule 602.

Figure 7:
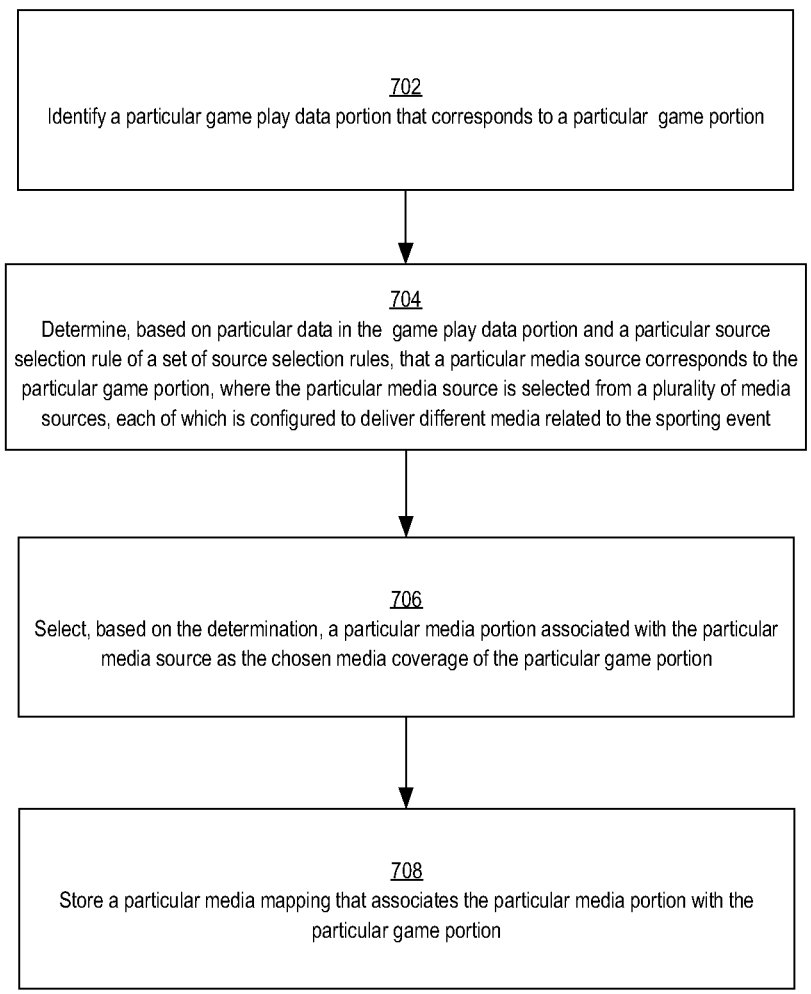
FIG. 7 illustrates an example process for determining a media mapping for a particular game portion.

FIG. 7 illustrates an example process for determining a media mapping for a particular game portion. The process of FIG. 7 may be performed at media processing unit 112. At block 702, media processing unit 112 identifies a particular game play data portion that corresponds to a particular game portion. The particular game portion may be the game portion for which media coverage is to be delivered next to the user.

In an embodiment, both the game play data received from game play date provider 150 and media received from game media sources 104, 106, 108, 110 are associated with timestamp information indicating the game portion to which each portion of the media and each portion of the game play data correspond. For example, game play data portion 404 comprises a time attribute and the value of the time attribute indicates the beginning game clock time of the game portion to which game play data portion corresponds. Similarly, timestamps may be embedded within the media received from one or more of game media sources 104, 106, 108, 110, or may otherwise be associated with the media. The timestamp information may identify, for each media portion, the portion of the game covered by the media portion. Media portions can be correlated with game play data portions based on their associated timestamp information. Timestamps may be expressed in game clock time, local time, universal time, or some other format for expressing the time of various game events.

In other embodiments, timestamp information may be otherwise associated with game play data. For example, timestamps may be separate from the remaining game play data and may identify the times at which certain plays described in the game play data begin and/or end.

Media processing unit 112 may identify the portion of the game play data that corresponds to the particular game portion by searching the timestamp information associated with the game play data. For example, if the particular game portion to be delivered next is the game portion beginning at a game clock time of 10:02 in Quarter 1, media processing unit 112 may identify the portion of the game play data that corresponds to the particular game portion by searching for the timestamp Q1, 10:02 in timestamp information associated with the particular game portion.

At block 704, media processing unit 112 determines that a particular media source corresponds to the particular game portion based on particular data in the identified game play data portion and a particular source selection rule of a set of source selection rules. The media source may be selected from a plurality of media sources, each of which is configured to deliver different media related to the sporting event.

A source selection rule may indicate that a particular media source is selected as the media source corresponding to a game portion if the game play data portion corresponding to the game portion comprises a certain value for a certain attribute. For example, source selection rule 602 indicates that Source 3 is selected as the corresponding media source for a game portion if the game play data corresponding to the game portion has a value of 4500 for the "team ID" attribute and a value of SF10 or SF20 for the "yard line" attribute. Source 3 may deliver data collected from a camera located near the San Francisco end zone facing the opposing team's end zone. Source selection rule 602 may have been determined in response to a determination that the media delivered by Source 3 would provide the best coverage a play performed by the particular team associated with the team identifier of 4500 and that occurs near the SF10 or SF20 yard line.

Media processing unit 112 may determine if a particular media source corresponds to a particular game portion by searching the game data portion corresponding to the particular game portion for one or more values identified by one or more content selection rules. For example, media processing unit 112 may determine a media mapping for the game portion beginning at a game clock time of 12:48 by locating game play data portion 404. Game play data portion 404 comprises a time attribute that indicates the beginning game clock time of the game portion to which game play data portion 404 relates, which may be used to locate the game portion.

Media processing unit 112 may search game play data portion 404 for one or more values identified by source selection rules 114. The rules of source selection rules 114 may be prioritized and each rule may be considered in order of priority until a condition for the selection of a media source has been selected. Media processing unit 112 may determine if source selection rule 602 is satisfied by looking up the value of the "team ID" and "yard line" attributes in game play data portion 404. In response to determining that the values of the "team ID" and "yard line" attributes match the values specified by source selection rule 602 for the attributes, media processing unit 112 may determine source selection information 604, which indicates that Source 3 corresponds to the game portion to which game play data portion 404 corresponds (i.e. the portion of the game spanning game clock times of 12:48 to 12:13 in Quarter 1).

In some embodiments, a game play data portion may be associated with a timestamp indicating a beginning time and an end time of the game portion. Media processing unit 112 may determine the portion of the game to which the game play data portion corresponds based on the beginning time and end time of the game play data portion.

In some embodiments, the received game play data may not be associated with an end time. For example, a game play data portion may only identify the beginning time of the game portion to which the game play data portion corresponds. In an embodiment, the end of the game portion to which a particular game play data portion corresponds may be determined based on the beginning timestamp associated with the particular game play data portion and the beginning timestamp associated with the game play data portion that follows the particular game play data portion. For example, the two beginning timestamps may be averaged to determine an approximate ending time for the game portion to which the particular game play data portion corresponds.

In another embodiment, the end time may be determined based on information other than the game play data. For example, media processing unit 112 may determine the end time of the game portion based on an analysis of media coverage of the game portion. The media that is analyzed to determine the end time may be the media coverage delivered from one of game media sources 104, 106, 108, 110 or from a different media source whose media is not delivered to any users.

To determine the end time of a particular game play data portion, media processing unit 112 may determine the beginning time of the particular game play data portion and the beginning time of the game play data portion following the particular game play data portion. Media processing unit 112 may analyze the portion of the media coverage that spans the position of the media associated with the particular game play data portion's beginning time and the following game play data portion's beginning time. For example, if a first game play data portion is associated with a beginning time of Q2, 08:10 in game clock time and the following game play data portion is associated with a beginning time of Q2, 08:50 in game clock time, media processing unit 112 may analyze the media coverage portion that is associated with the portion of the game occurring between Q2, 08:10 and Q2, 08:50 to determine if the occurrence of a particular sound or visual feature can be recognized. The portion of the media coverage may be identified based on timestamp information associated with the media coverage.

A game play data portion may represent a single play and the particular sound or visual feature whose occurrence media processing unit 112 may recognize may be, for example, the sound of a whistle in an audio recording or the appearance of a particular hand signal by a referee or another official of the sporting event, both of which may indicate the end of a play in the sporting event. Based on the recognized sound or visual feature, media processing unit 112 may determine a particular position of the media coverage that corresponds to the ending of a play. The end time of a particular game portion may be determined based on a time associated with the particular position of the media coverage at which the sound or visual feature occurs. For example, media processing unit 112 may determine that a timestamp of Q2, 08:30 is associated with the position of particular media coverage at which the whistle sound begins. Based on that determination, media processing unit 112 may determine Q2, 08:30 to be the end time of a particular game play data portion.

In some embodiments, media processing unit 112 receives different game play data from different game play data providers. In some embodiments, media processing unit 112 selects a particular media source for a game portion based on information received from two different game play data providers. For example, media processing unit 112 may determine the value for a particular attribute in a game play data received from a secondary game play data provider if the game play data received from the primary game play data is insufficient with regards to the particular attribute. In another embodiment, a game play data received from a first game play data provider describe certain attributes of game plays that are not described by game play data received from the second game play data provider. Media processing unit 112 may select a particular media source for a game portion based on both the data provided by the first game play data provider and the data provided by the second game play data provider.

Media processing unit 112 may use game play data from one provider to select a media source for one portion of the game and game play data from a different provider to select a media source for another portion of the game. For example, media processing unit 112 may select a first media source for a first game portion based on game play data received from one source and may select a second media source for a different game portion based on different game play data received from a second source different from the first.

At block 706, media processing unit 112 selects, based on the determination that the particular media source corresponds to the particular game portion, a particular media portion associated with the particular media source as the chosen media coverage of the particular game portion. In response to determining that Source 3 corresponds to the game portion spanning game clock times of 12:48 to 12:13 in Quarter 1, media processing unit 112 may select the portion of the media associated with Source 3 that correspond to the game portion spanning game clock times of 12:48 to 12:13 as the chosen media coverage of the game portion spanning game clock times of 12:48 to 12:13. Media processing unit 112 may locate the media portion that correspond to the game portion spanning game clock times of 12:48 to 12:13 in Quarter 3 by searching timestamp information associated with the media.

At block 708, media processing unit 112 stores a particular media mapping that associates the particular media portion with the particular game portion. The media mapping identifies both the particular media portion and the particular game portion. For example, the particular media mapping may be "Q3, 12:48-12:13."→Source 3; Q3, 12:48-12:13." In another embodiment, the particular media portion may be extracted from the remaining portions of the media received from the particular media source and may be stored in association with a game portion identifier such as "Q3, 12:48-12:13."

In some embodiments, a game portion may correspond to a plurality of different media portions, where each media portion is from a different source. A source selection rule may indicate that a plurality of media sources are selected as the media sources corresponding to a game portion if particular values are included in the game play data portion corresponding to the game portion. For example, a particular source selection rule may be "if (team ID==4500) AND (yardline==(SF30 OR SF 40))→Source 1 and Source 5".

According to such a source selection rule, if a particular game play data portion comprises a value of 4500 for the teamID attribute and a value of SF30 or SF40 for the yardline attribute, media processing unit 112 may associate media from media sources Source 1 and Source 5 with the game portion to which the particular game play data portion corresponds.

By automatically selecting media sources, a user may automatically be presented with the best view of a game event with minimal or no efforts by a human game-day operator and without the time delay which may be associated with the selection of media sources by a game day operator. A system where the media source is automatically selected based on the processes described herein may also be free of the errors which may result in a system where media sources are selected by a human game-day operator.

Additionally, in a system where media sources are automatically selected, media selected from a wider variety of media sources may be presented to a user than in other systems where media sources are selected manually. Since a game-day operator is limited by the number of media sources he can analyze within a certain brief period of time, the game-day operator must necessarily select media from a more limited set of media sources.

5.0 Source Selection Rules

A source selection rule contains instructions for the selection of a media source. A source selection rule may indicate that a particular media source is selected as the media source corresponding to a game portion if a particular type of game event occurs during the game portion. Media processing unit 112 may determine if the particular type of game event occurs during the game portion by determining the value of certain attributes in the portion of the received game play data that corresponds to the game portion.

An example source selection rule may indicate that a particular media source is selected as the corresponding media source for a game portion if the game portion comprises a scoring play by a particular player or team. The particular media source identified by the source selection rule may be associated with the scoring player or scoring team. For example, the particular media source may be associated with a radio station or local TV station based in a city associated with the particular player or team that scored. In another embodiment, the particular media source may be associated with a player or team that opposes the team or player that scored during the game portion. For example, a user that is a fan of a team that scores may wish to hear or see the reaction of the opposing team's fan during the scoring play.

A game play data portion corresponding to a game portion that comprises a scoring play may contain an attribute value indicating that the corresponding game portion includes a scoring play and may identify the team that scored during the play. Media processing unit 112 may determine if the game portion comprises a scoring play by the particular player or team by determining whether the value of the "scoring" attribute is "true" in the corresponding game play data portion and whether the value of the "scoring type" attribute is an identifier of the particular player or team in the corresponding game play data portion.

Other source selection rules may indicate that a particular media source is to be selected as the corresponding media source for a game portion if some other game event of interest occurs during the game portion. Other game events of interest may include, in a football game, an advancement of over 30 yards in a particular direction during a single play, a turnover, a fumble, or some other event. In other sports, game events of interest may be, for example, the running of a particular base or completion of a home run by a player in baseball, the occurrence of a power play in hockey, or the occurrence of a penalty kick in soccer.

Other example source selection rules may be location-based rules, which indicate that a particular media source is to be selected as the corresponding media source if the game portion comprises action occurring near a certain location. For example, a source rule for a hockey game may indicate that particular media source is to be selected as the corresponding media source for a game portion, if the game action during the game portion occurs near a particular end zone. Game play data portions may comprise attribute values that indicate the location(s) at which the game action of the corresponding game portion occurred. For example, game play data portion comprises a "yard line" attribute whose value indicates the yard line at which the corresponding play began.

The logic for selecting media sources based on information about game events, as described in the game play data, may automatically enable the best media source to be selected.

6.0 Mapping Multiple Media Portions to a Game Portion

In some embodiments, game portions may be associated with or mapped to multiple media portions. Media processing unit 112 may select multiple media sources to associate with a game portion and may select multiple media portions to deliver to the user as media coverage of the game portion. For example, a user may be concurrently presented with three (3) different media portions, each of which constitutes coverage of the same game event, for example, from a different angle, perspective or location. The first media portion may comprise a video of the game event from a viewpoint facing one direction, the second media portion may comprise a video of the same game event from a viewpoint facing the opposite direction, and the third media portion may comprise a video of spectator reaction to the game event.

In another embodiment, media processing unit 112 may cause display of a graphical interface that allows a user to select one of three different media sources as the source for the media coverage. Media processing unit 112 may cause the graphical interface to display in response to receiving a user request to view media coverage of a particular game portion, such as receiving a selection of media control 506. For example, media processing unit 112 may display a graphical interface with selectable options titled "Sky Cam," "Sideline Cam," and "Sponsor Cam," with each option representing a particular media source. The Sky Cam media source may correspond to a media capture device suspended above the event venue, the Sideline Cam media source may correspond to a media capture device located along the sideline, and the Sponsor Cam media source may correspond to a plurality of media capture devices. The particular combination of media coverage provided by the Sponsor Cam media source may be selected by a game-day operator associated with a sponsor of the sporting event. In response to a user selecting a particular media source, the media coverage from the selected media source may be delivered to the user's mobile computing device.

In another embodiment, media coverage from all the three media sources corresponding to a game portion may each play consecutively in response to a user request to view media coverage of the game portion. For example, first the media coverage of the game portion as provided by the Sky Cam may play. Next the media coverage provided by the Sideline Cam may play. Finally, the media coverage provided by the Sponsor Cam may play. In such an embodiment, a particular media mapping may indicate that the portion of the game that occurs during a game clock time range of 09:09-08:50 in Quarter 2 is associated with the portion of the media provided by Sponsor Cam that corresponds to game clock times of Q2, 09:09-08:50, the portion of the media provided by Sideline Cam that corresponds to game clock times of Q2, 09:09-08:50, and the portion of the media provided by Sky Cam that corresponds to game clock times of Q2, 09:09-08:50. In other embodiments, a different number of media sources may correspond to a game portion.

Presenting media from multiple sources, for example from media sources that provide media coverage from different viewpoints, media processing unit 112 may further ensure that the best media coverage is being delivered to the user.

In some embodiments, the media portion is selected automatically by media processing unit 112 and may supplement, rather than replace, other media that is hand-picked by a game media operator or some other default media.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
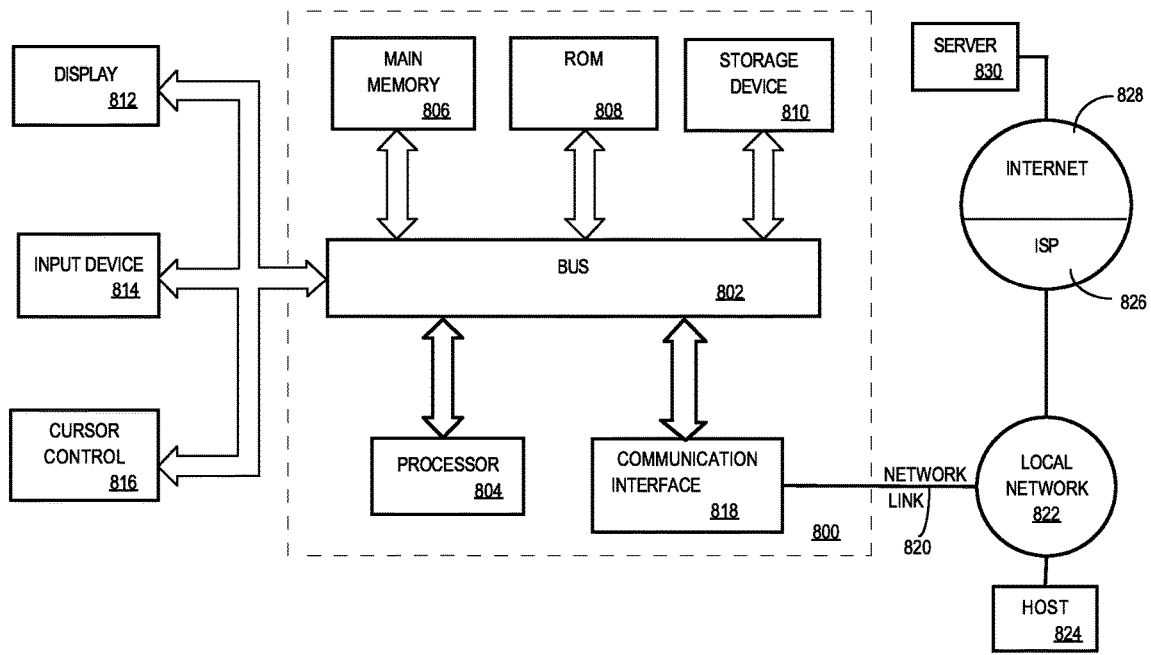
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   using a server computer, storing a plurality of source selection rules, wherein each source selection rule comprises an identifier of a team in possession and an identifier of a media feed;
   using the server computer, receiving game play data relating to a game event of a sporting event, wherein the game play data comprises a direction of play, a field location, and a time interval;
   using the server computer, receiving a plurality of different media feeds that show the same game event from a plurality of different video cameras and corresponding to the same direction of play, field location and time interval;
   the server computer determining, based on receiving a particular identifier of a team in possession when the game event occurred, multiple source selection rules of the plurality of source selection rules, that are satisfied by one or more of the direction of play, field location, and time interval in the game play data for the game event;
   the server computer, based on the multiple source selection rules that satisfy the game play data for the game event, selecting a subset of media feeds from among the plurality of media feeds which are identified by the multiple source selection rules, wherein the subset of media feeds comprises a particular media feed;
   in response to the selecting, using the server computer, transmitting or storing multiple portions, of the subset of media feeds, that correspond to the time interval of the game play data.

2. The computer-implemented method of claim 1 wherein the selecting comprises a user selecting the particular media feed from the subset of media feeds identified by the multiple source selection rules, of the plurality of source selection rules, that are satisfied by the game play data.

3. The computer-implemented method of claim 1 wherein each source selection rule comprises a priority, and wherein the selecting comprises, using the server computer, selecting the particular media feed identified by a particular source selection rule having a highest priority of the multiple source selection rules that are satisfied by the game play data.

4. The computer-implemented method of claim 1 wherein the game play data comprises a distance traveled during the game event.

5. The computer-implemented method of claim 1 wherein the game play data comprises an amount scored, or an attempt to score, during the game event.

6. The computer-implemented method of claim 1 wherein the sporting event is an American football game, and wherein the game play data comprises a down of a possession.

7. The computer-implemented method of claim 1 wherein receiving game play data comprises, using the server computer, receiving game play data from multiple game play data operators.

8. A computer-implemented method providing an improvement in efficient selection and delivery of a video signal from one of a plurality of available video signals by automatically selecting the video signal based upon locations of plays in an American football game, the method comprising:

using a server computer, storing a plurality of video source selection rules, wherein each video source selection rule comprises an identifier of a team in possession and an identifier of a particular video media feed from among a plurality of available video media feeds associated with different camera positions in a stadium;

using the server computer, receiving game play data relating to a football play of an American football game, wherein the game play data comprises a direction of play, a field location comprising a yard line number, and a time interval indicating a length of time of the play;

using the server computer, determining that a plurality of mobile computing devices are in the stadium;

the server computer determining, based on an identifier of a team in possession, particular source selection rules of the plurality of source selection rules, that are satisfied by the game play data;

the server computer, based on said determining that a plurality of mobile computing devices are in the stadium, providing, to the plurality of mobile computing devices that are in the stadium, a plurality of images associated with a subset of the video media feeds identified by only those particular video source selection rules, wherein said subset of the video media feeds share a team in possession, direction of play, and time interval, that satisfy those particular video source selection rules;

using the server computer, receiving a selection of a particular video media feed identified by a particular video source selection rule, of the plurality of video source selection rules, that is satisfied by the game play data;

in response to the selecting and based on said determining that a plurality of mobile computing devices are in the stadium, using the server computer, transmitting a portion of the particular video media feed that corresponds to the time interval of the game play data to a plurality of mobile computing devices that are in the stadium.

9. The computer-implemented method of claim 8 wherein receiving the selection comprises, using the server computer, receiving a selection of multiple video media feeds identified by multiple video source selection rules, of the plurality of video source selection rules, that are satisfied by the game play data, and wherein the transmitting or storing comprises, using the server computer, transmitting or storing multiple portions, of the multiple video media feeds, that correspond to the time interval of the game play data.

10. The computer-implemented method of claim 8 wherein the selecting comprises one of the mobile computing devices selecting the particular video media feed from multiple video media feeds identified by multiple video source selection rules, of the plurality of video source selection rules, that are satisfied by the game play data.

11. The computer-implemented method of claim 8 wherein each video source selection rule comprises a priority, and wherein the selecting comprises selecting the particular video media feed identified by the particular video source selection rule having a highest priority of multiple video source selection rules that are satisfied by the game play data.

12. The computer-implemented method of claim 8 wherein the game play data comprises a distance that a team has moved on the field during the football play.

13. The computer-implemented method of claim 8 wherein the game play data comprises an amount of points scored, or an attempt to score, during the football play.

14. The computer-implemented method of claim 8 wherein the game play data comprises a down of a possession.

15. The computer-implemented method of claim 8 wherein receiving game play data comprises, using the server computer, receiving game play data from multiple game play data operators.

16. A server computer providing an improvement in efficient selection and delivery of a video signal from one of a plurality of available video signals by automatically selecting the video signal based upon locations of plays in an American football game, the server computer comprising:

a communication interface configured to receive game play data, transmit images, receive selections, and transmit video media feeds;

a processor connected to the communication interface;

a computer-readable storage medium coupled to the processor and storing instructions which when executed by the processor, cause performing:

storing a plurality of video source selection rules, wherein each video source selection rule comprises an identifier of a team in possession and an identifier of a particular video media feed from among a plurality of available video media feeds associated with different camera positions in a stadium;

through the communication interface, receiving game play data relating to a football play of an American football game, wherein the game play data comprises a direction of play, a field location comprising a yard line number, and a time interval indicating a length of time of the play;

determining that a plurality of mobile computing devices are in the stadium;

the server computer determining, based on an identifier of a team in possession, particular source selection rules of the plurality of source selection rules, that are satisfied by the game play data;

based on said determining that a plurality of mobile computing devices are in the stadium, providing through the communication interface, to the plurality of mobile computing devices that are in the stadium, a plurality of images associated with a subset of the video media feeds identified by only those particular video source selection rules, wherein said subset of the video media feeds share a team in possession, direction of play, and time interval, that satisfy those particular video source selection rules;

through the communication interface, receiving a selection of a particular video media feed identified by a particular video source selection rule, of the plurality of video source selection rules, that is satisfied by the game play data;

through the communication interface and based on said determining that a plurality of mobile computing devices are in the stadium, transmitting a portion of the particular video media feed that corresponds to the time interval of the game play data to a plurality of mobile computing devices that are in the stadium.

17. The server computer of claim 16 wherein each source selection rule comprises a priority, and wherein the instructions, when executed by the processor, cause performing selecting the particular media feed identified by the particular source selection rule having a highest priority of multiple source selection rules that are satisfied by the game play data.

18. The server computer of claim 16 wherein the game play data comprises a distance traveled during the football play.

19. The server computer of claim 16 wherein the game play data comprises a down of a possession.

* * * * *